(12) United States Patent
Dawson (10) Patent No.: US 10,001,217 B2
(45) Date of Patent: Jun. 19, 2018

(54) MAGNETIC ROTARY SEAL WITH IMPROVED DRAIN BACK

(71) Applicant: Isomag Corporation, Baton Rouge, LA (US)

(72) Inventor: Stephen M. Dawson, Baton Rouge, LA (US)

( * ) Notice: Subject to any disclaimer, the term of this patent is extended or adjusted under 35 U.S.C. 154(b) by 422 days.

(21) Appl. No.: 14/995,850

(22) Filed: Jan. 14, 2016

(65) Prior Publication Data

US 2016/0201803 A1   Jul. 14, 2016

Related U.S. Application Data

(60) Provisional application No. 62/103,154, filed on Jan. 14, 2015.

(51) Int. Cl.
*F16J 15/54* (2006.01)
*F16J 15/34* (2006.01)

(52) U.S. Cl.
CPC ....... *F16J 15/3404* (2013.01); *F16J 15/3444* (2013.01); *F16J 15/3464* (2013.01)

(58) Field of Classification Search
CPC .. F16J 15/3444; F16J 15/3404; F16J 15/3464; F16J 15/34
See application file for complete search history.

(56) References Cited

U.S. PATENT DOCUMENTS

5,730,447 A * 3/1998 Dawson ............... F16J 15/3444
                                                     277/378
6,805,358 B2  10/2004 Dawson
7,722,050 B2 * 5/2010 Roddis ................. F16J 15/3444
                                                     277/378
8,113,545 B2 * 2/2012 Takahashi ............ F16J 15/3404
                                                     277/361
8,201,830 B2 * 6/2012 Nobrega ................ F16J 15/348
                                                     277/345
8,474,826 B2 * 7/2013 Villeneuve ........... F16J 15/3444
                                                     277/377
9,587,743 B2 * 3/2017 Jaskot .................. F16J 15/4476
(Continued)

*Primary Examiner* — Vishal A Patel
(74) *Attorney, Agent, or Firm* — Warner J. Delaune; Baker Donelson, et al.

(57) ABSTRACT

A magnetic rotary seal with improved drain back is provided, comprising a housing adapted to matingly engage a fixed opening, wherein the housing includes an annular retaining member. A stator is positioned within the housing, wherein the stator includes a first resilient sealing member adapted to sealingly contact the housing, and a first frictional sealing face. A rotor is positioned between the annular retaining member of the housing and the stator, wherein the rotor includes a second resilient sealing member adapted to sealingly contact a shaft, and a second frictional sealing face. Magnets are operatively positioned between the stator and the rotor urging engagement of the first frictional sealing face of the stator with the second frictional sealing face of the rotor. The housing further includes an annular channel for receiving lubricating fluids from within the seal, and a drain port in fluidic communication with the channel. The annular retaining member includes one or more expulsion ports formed therein to permit lubricating fluids to move away from the rotor and into the channel during operation of the seal.

7 Claims, 6 Drawing Sheets

(56) References Cited

U.S. PATENT DOCUMENTS

2002/0167131 A1\* 11/2002 Orlowski ............. F16J 15/4478
  277/371
2008/0050261 A1\* 2/2008 Roddis ................. F16J 15/3444
  418/104

\* cited by examiner

MAGNETIC ROTARY SEAL WITH IMPROVED DRAIN BACK

CROSS-REFERENCE TO RELATED APPLICATIONS

This nonprovisional application claims the benefit of priority to U.S. provisional application, Ser. No. 62/103,154, filed on Jan. 14, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

This invention relates to magnetic seals for rotating shafts, and in particular, magnetic seals which minimize the presence of lubricants at the seal faces by using an improved drain-back design.

2. Background

Magnetic seals have proven reliable for use on rotary shafts. Magnetic seals have a stationary ring, referred to herein as a stator, and a rotating ring, referred to herein as a rotor. The stator is generally fixed to the shaft housing and does not rotate with the shaft. The rotor generally rotates with the shaft. The stator and rotor touch through sealing faces, which provides the seal between the stator and rotor. The sealing faces are subject to frictional forces due to the attractive forces of the magnets and the rotation of the rotor relative to the stator.

Various means are employed to maintain the seal between the sealing faces. Magnetic means are one method utilized to keep the stator and rotor contact faces in contact through the attractive forces of permanent magnets. The magnets can be positioned on either the stator or rotor, with the magnets interacting with ferrous materials in the opposite component. The features of magnetic seals are shown in U.S. Pat. No. 5,078,411 to Adams, hereby incorporated by reference. As is shown in Adams, the magnets can be positioned on either the stator (FIG. 7) or rotor (FIG. 4).

An improved magnetic seal is shown in U.S. Pat. No. 5,730,447 to Dawson. This patent discloses a "floating" inner annulus on the stator, which helps keep the contact faces in contact in the presence of shaft tilt or shaft misalignment. Another magnetic seal is shown in U.S. Pat. No. 6,805,358, also to Dawson, et al., which allows axial shaft movement in either direction without jeopardizing the sealing contact between the sealing faces.

Prior art magnetic rotary seals all attempt to prevent the seepage of lubricating oil across the sealing faces, because the oil must remain only within the machinery. Oil that travels outside of the proposed seal creates well known maintenance and environmental problems. Thus, the sealing faces are considered to the "primary seal", or the main structural impediment to oil seeping outside of the rotating shaft. However, such attempts have met with limited success, because the even the best seal faces do not establish a perfect seal, especially in a vibrating and rotating environment. Therefore, it can be appreciated that in most prior designs which rely upon the seal faces as the primary seal, a common goal is to maintain a relatively high contact force between the sealing faces, under the theory that greater contact force will minimize oil seepage. However, some disadvantages to maintaining high contact forces are: (1) high operating temperatures due to increased friction at the sealing faces, (2) shorter operating life of the seal faces due to such friction, (3) use of stronger and more expensive magnets required to establish high contact forces, and (4) small operating gaps between the magnets and the opposing component in order to maintain high attractive forces.

The present design of an improved magnetic rotary seal discloses an advantageous structure that permits (and actually urges) lubricating oils which are drawn within the rotary seal to drain back out of the seal. Thus, if the oil is kept away from the rotating sealing faces, those sealing faces are no longer required to function as the "primary seal" as in prior designs. As will be seen below in the figures and description, this improved design resolves most of the problems mentioned above. For example, when the sealing faces no longer need to function as a primary seal, the high contact forces between them is no longer required. As a result, the seal operates with less friction and at lower temperatures, which substantially extends the life of the seal. Moreover, fewer or less powerful magnets may be required to establish the smaller contact force between the sealing faces. However, even with the same number or type of magnets, the operating gap between the magnets and the opposing component (the "magnetic operating gap") can now be greater than prior designs. Greater magnetic operating gaps not only introduce flexibility and lower tolerances to the assembly, but they also provide a built-in allowance for gradual wear between the sealing faces before maintenance or refurbishment is required.

SUMMARY OF THE INVENTION

Therefore, a magnetic rotary seal with improved drain back is provided, comprising a housing adapted to matingly engage a fixed opening, wherein the housing includes an annular retaining member. A stator is positioned within the housing, wherein the stator includes a first resilient sealing member adapted to sealingly contact the housing, and a first frictional sealing face. A rotor is positioned between the annular retaining member of the housing and the stator, wherein the rotor includes a second resilient sealing member adapted to sealingly contact a shaft, and a second frictional sealing face. Magnets are operatively positioned between the stator and the rotor urging engagement of the first frictional sealing face of the stator with the second frictional sealing face of the rotor. The housing further includes an annular channel for receiving lubricating fluids from within the seal, and a drain port in fluidic communication with the channel. The annular retaining member includes one or more expulsion ports formed therein to permit lubricating fluids to move away from the rotor and into the channel during operation of the seal.

In a preferred embodiment, the magnet includes a plurality of magnets circumferentially spaced within the stator.

In another embodiment, the first frictional sealing face of the stator is a composite material affixed to the stator.

In a more preferred embodiment, the expulsion port includes a plurality of expulsion ports circumferentially formed into the annular retaining member.

In another preferred embodiment, the first frictional sealing face of the stator extends a predetermined distance from the stator, defining a magnetic operating gap between the rotor and the stator when the first and second frictional sealing faces are in contact with one another.

More preferably, the magnetic operating gap is set to establish a predetermined sealing force between the first and second frictional sealing faces.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
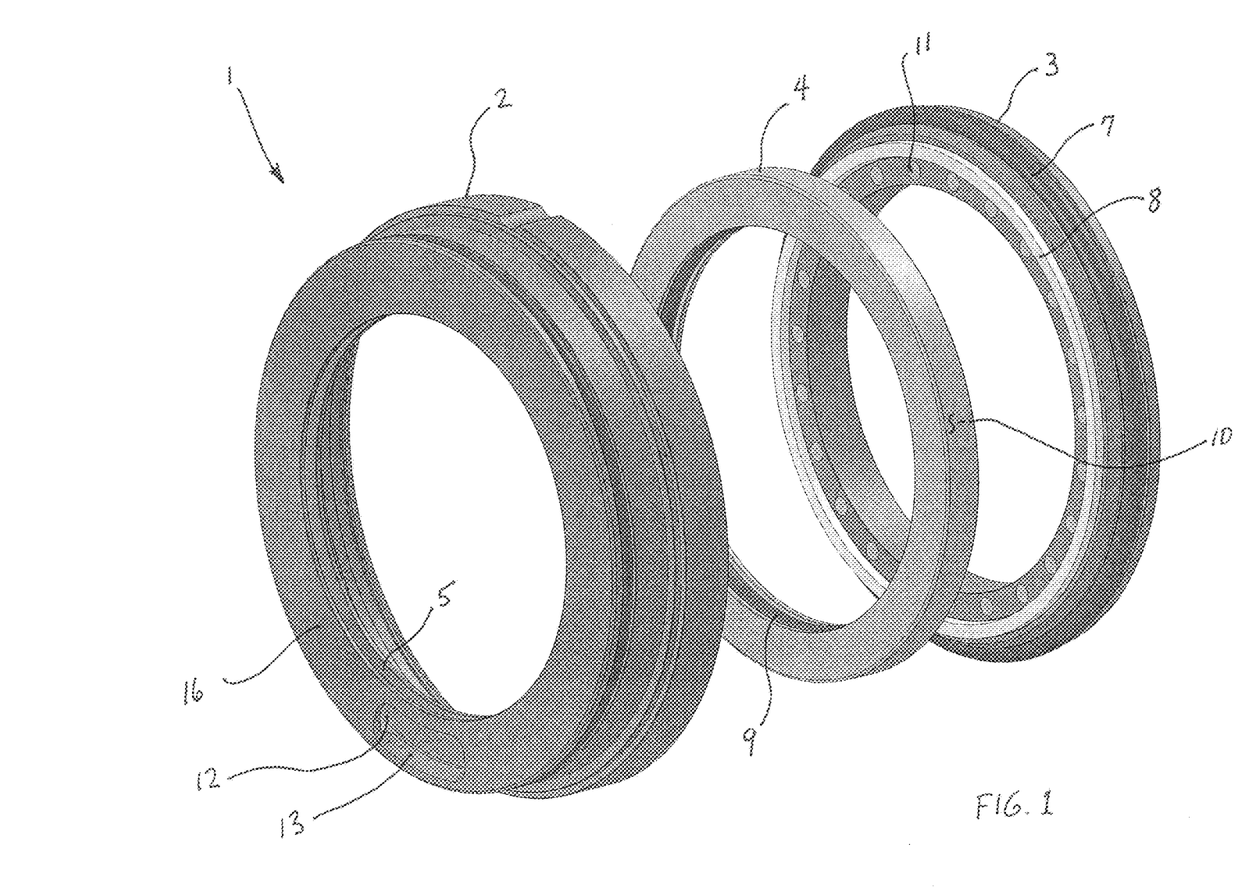
FIG. 1 shows a perspective exploded oil side view of the improved magnetic rotary seal with its three primary components (stator, rotor, and housing) in a preferred embodiment.
Figure 2:
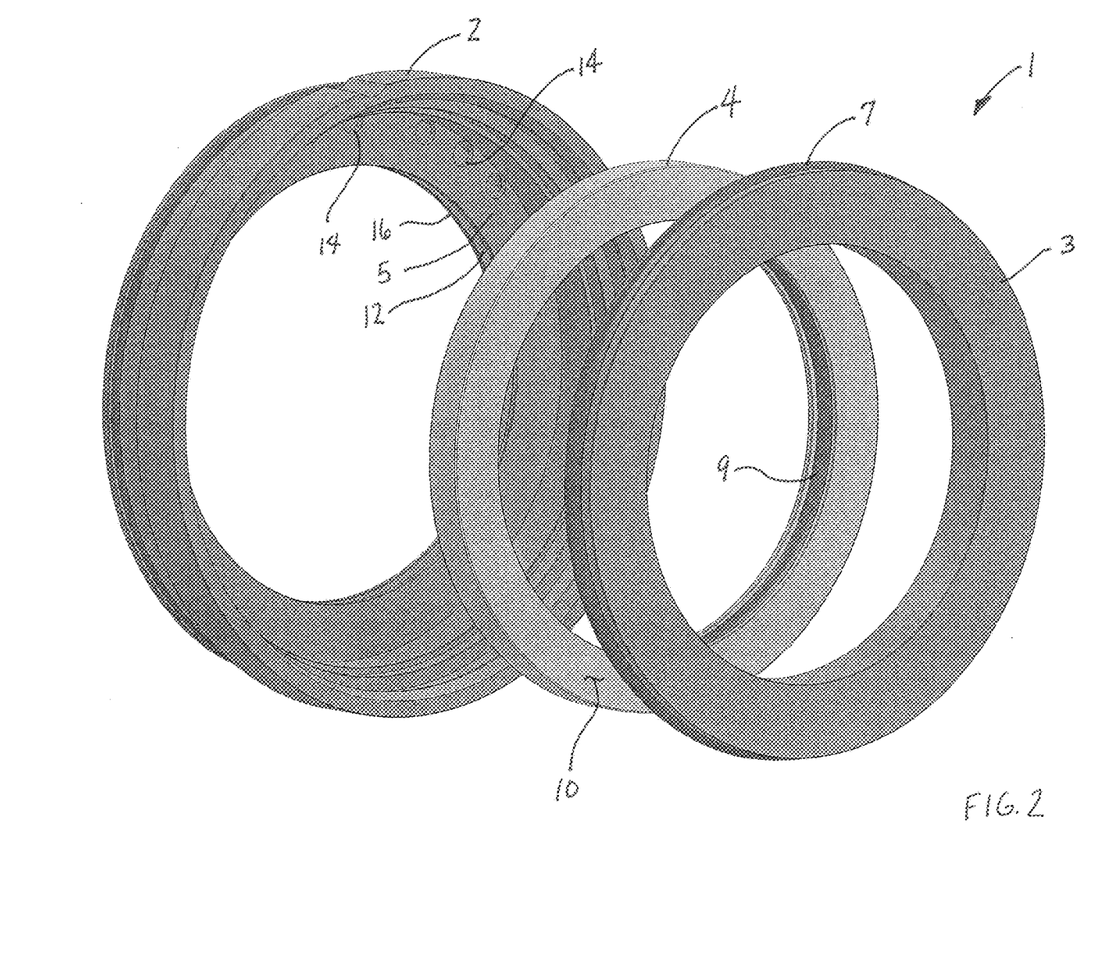
FIG. 2 shows an atmosphere side view of FIG. 1.
Figure 3:
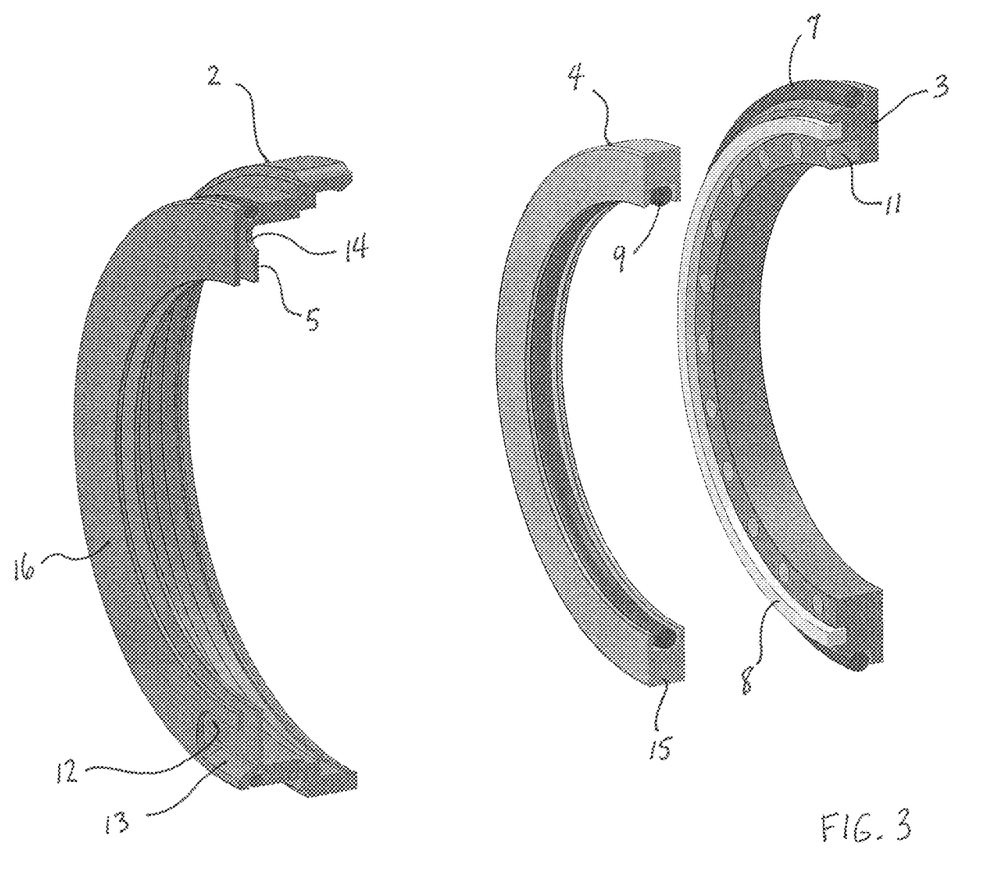
FIG. 3 shows a sectional view of FIG. 1.

Referring now to the drawings, and in particular FIG. 1, a magnetic rotary seal with improved drain back 1 is shown, generally comprising a housing 2, a stator 3, and a rotor 4. The view of FIG. 1 is from the "oil side" of the seal 1, meaning that portion of the seal 1 which is facing the inside of the machinery in which lubricating oil is present. FIG. 2 is a similar view to FIG. 1 of the same components of the seal 1, but from the "atmosphere side", meaning that portion of the seal 1 which is facing the outside of the machinery. FIG. 3 is a sectional view of the components of FIG. 1 depicting a more detailed view of the geometry of the present seal design. The housing 2 is adapted to matingly engage a fixed opening in whatever mechanical environment it is to be installed. The housing 2 includes an annular retaining member 5 which extends radially toward the shaft 6.

A stator 3 is positioned within the housing 2, wherein the stator 3 includes a first resilient sealing member 7 (typically an O-ring) adapted to sealingly contact the housing 2, and a first frictional sealing face 8. The first frictional sealing face 8 of the stator 3 is typically a separate composite material affixed to the stator 3.

A rotor 4, typically constructed a ferrous material, is positioned between the annular retaining member 5 of the housing 2 and the stator 3, wherein the rotor 4 includes a second resilient sealing member 9 adapted to sealingly contact the shaft 6, and a second frictional sealing face 10.

Figure 4A:
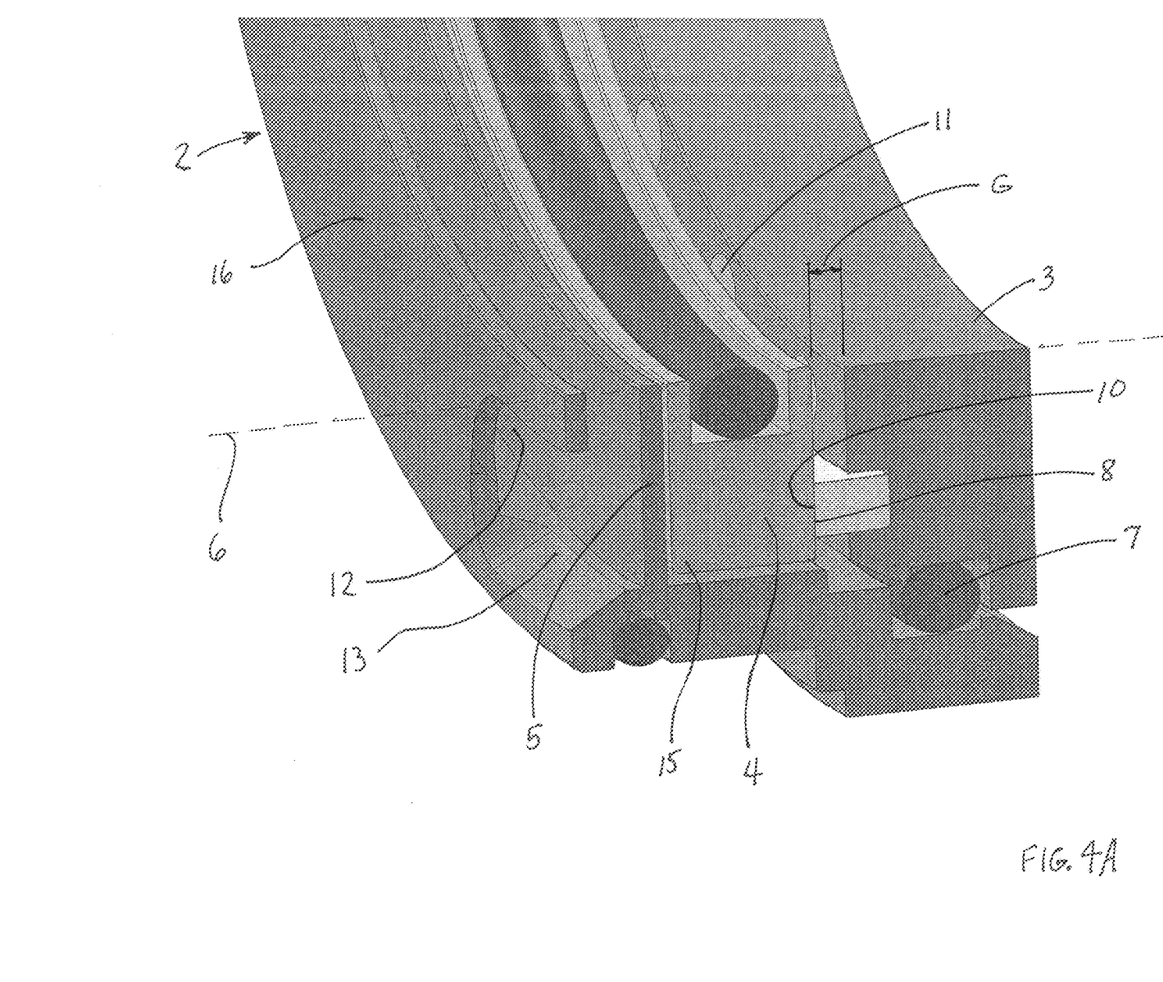
FIG. 4A is a detailed sectional view of the assembled magnetic rotary seal of FIG. 1 depicting the drain port area of the seal.
Figure 4B:
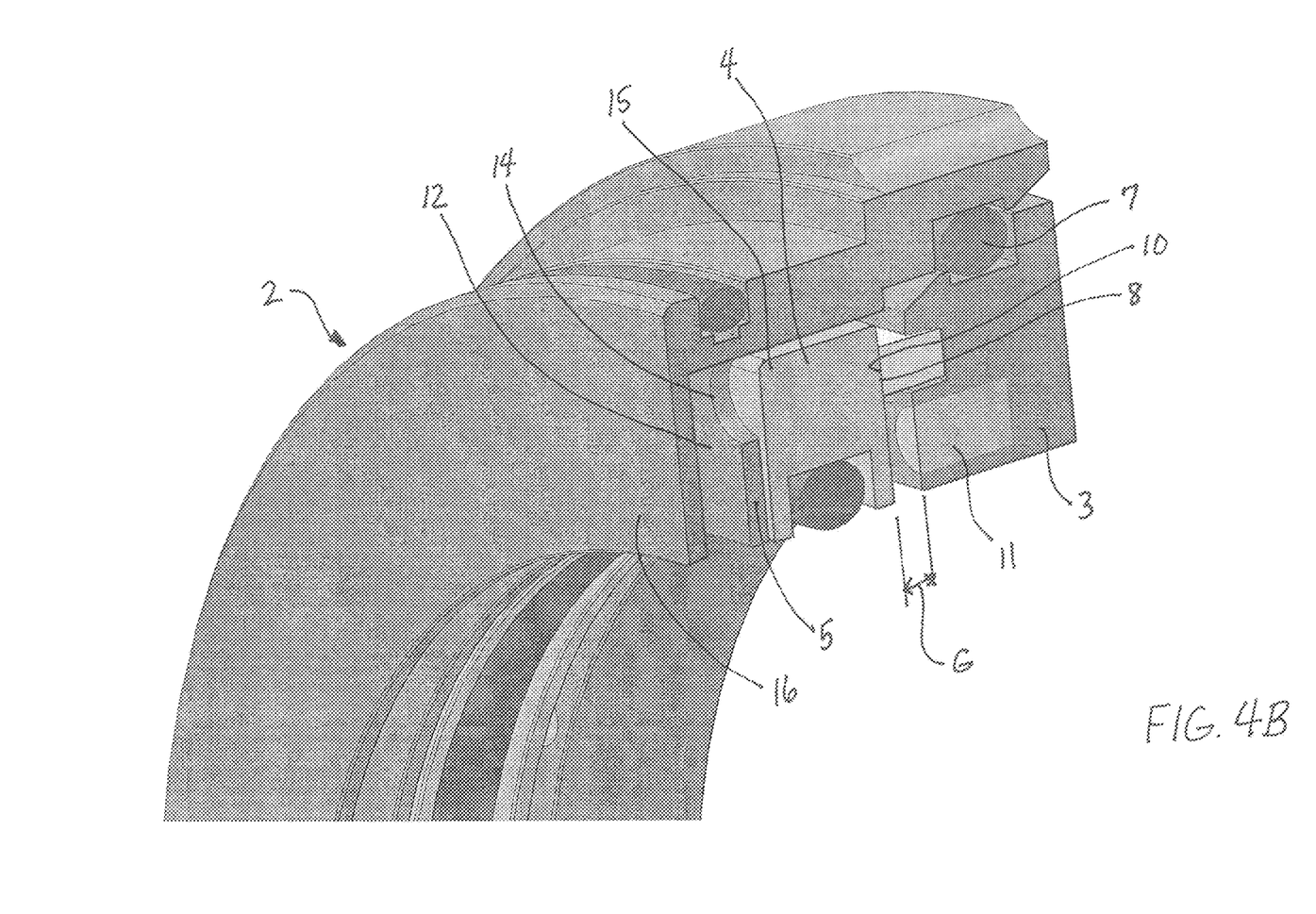
FIG. 4B is a detailed sectional view of the assembled magnetic rotary seal of FIG. 1 depicting the expulsion port area of the seal.

At least one magnet 11 is operatively positioned between the stator 3 and the rotor 4 urging engagement of the first frictional sealing face 8 of the stator 3 with the second frictional sealing face 10 of the rotor 4. The magnet 11 typically includes a plurality of magnets 11 circumferentially spaced within the stator 3. In a preferred embodiment, best shown in the detailed sectional views of FIGS. 4A and 4B, the first frictional sealing face 8 of the stator 3 extends a predetermined distance from the stator 3, defining a magnetic operating gap G between the rotor 4 and the stator 3 when the first and second frictional sealing faces 8, 10 are in contact with one another. More preferably, the magnetic operating gap G is maintained to establish a predetermined sealing force F between the first and second frictional sealing faces 8, 10.

In order to facilitate displacement of lubricating fluids, such as oil, away from the sealing faces 8, 10, the housing 2 further includes an annular channel 12 for receiving lubricating fluids from within the seal 1, and a drain port 13 in fluidic communication with the channel 12. The annular channel 12 is essentially defined by the annular retaining member 5 and the external wall 16 of the housing 2. The annular retaining member 5 includes one or more expulsion ports 14 formed therein to permit lubricating fluids to move away from the rotor 4 and into the channel 12 during operation of the seal 1. Typically, and as illustrated in FIG. 2, the expulsion port 14 includes a plurality of expulsion ports 14 circumferentially formed into the annular retaining member 5, such that lubricating fluids have an easy pathway away from the rotor 4 during operation of the seal 1. The expulsion ports 14 are shown formed near the upper portion of the retaining member 5 of the housing 2, because that is the farthest point away from the drain port 13. For example, in FIG. 2, four expulsion ports 14 are shown, but with the understanding that a greater or lesser number may be required or desired for allowing oil to leave the rotor area. Alternatively, the expulsion ports 14 may also comprise one or more slots or other openings to achieve a similar function. However, they may be formed in any additional locations around the retaining member 5 without detracting from the design.

In common operating conditions, the shaft 6 and rotor 4 are turning at a sustained speed of about 3600 RPM in many applications, so the resulting centrifugal forces urge the oil toward a radially distal point 15 on the rotor 4, and in the annular space defined between rotor 4 and annular retaining member 5. Such annular space is sufficiently small to result in capillary movement of oil radially to the expulsion ports 14. Therefore, oil will follow the path of least resistance from this annular space through the expulsion ports 14, and then into the channel 12. Once the oil is in the channel 12, it falls via gravity toward the bottom of the installed seal 1 toward the drain port 13 formed in the external wall 16 and exits the housing 2. It should be noted that the external wall 16 also serves to shield the seal from oil splashing or oil mist during operation, and prevents oil from entering the expulsion ports 14 from the wrong direction.

It can be appreciated that the structure and function of this improved seal design prevents oil from accumulating near the frictional sealing faces 8, 10. Under these conditions, there is no further need for the frictional sealing faces 8, 10 to serve as a primary seal. Therefore, as explained above, the required force F between the sealing faces 8, 10 can be greatly reduced, resulting in a number of distinct advantages. Specifically, the magnetic operating gap G can be increased in order to reduce the sealing force F at the faces 8, 10. The reduced sealing force F means that the operating temperature of the seal 1 is reduced, resulting in a longer operational life for the sealing face 8 and less maintenance required.

Figure 5:
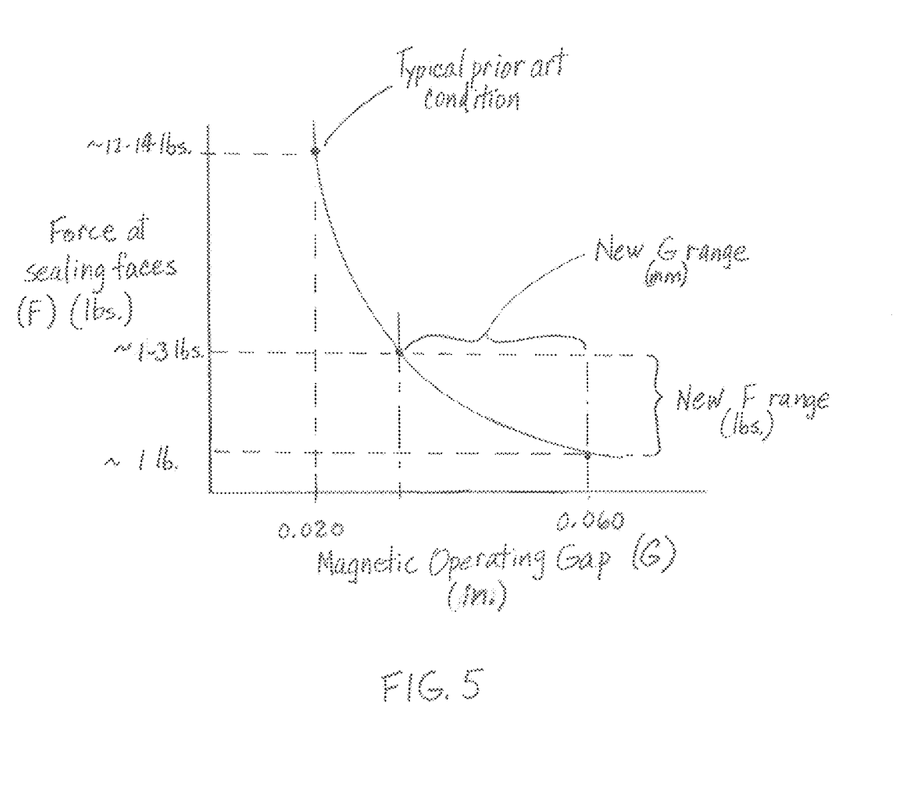
FIG. 5 is a graph showing the prior art conditions versus new operating range for the seal, depicting forces at the sealing faces (F) as a function of the magnetic operating gap (G).

Finally, FIG. 5 depicts a graph showing a comparison between prior art seal conditions versus the new operating range for the seal of the present invention. Under prior art seals, as explained above, the sealing force F needed to be high enough to prevent oil seepage across the sealing faces, typically in the 12-14 lb. range. Thus, the magnetic operating gap G was quite small, approximately 0.020±0.002 inches, in order to maintain such a high sealing force F. However, the present invention provides a much more effective solution to undesirable oil within the seal, causing the oil to exit via the expulsion ports 14 before reaching the sealing faces 8, 10. Because a lesser sealing force F is required, preferably in the range of about 1-3 lbs., the magnetic operating gap G can be much greater, approximately 0.060±0.002 inches, using the same magnets 11. As the sealing face 8 gradually wears down due to friction, the magnetic operating gap G is decreased, but the operating range is still substantially better than the prior art. In other words, starting with a wider gap G allows the seal 1 to maintain a low sealing force F through the extended life of the seal.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only, and the scope of the present invention is to be limited only by the following claims.

The invention claimed is:

1. A magnetic rotary seal with improved drain back, comprising:
   (a) a housing adapted to matingly engage a fixed opening, wherein the housing includes an annular retaining member;
   (b) a stator positioned within the housing, wherein the stator includes a first resilient sealing member adapted to sealingly contact the housing, and a first frictional sealing face;
   (c) a rotor positioned between the annular retaining member of the housing and the stator, wherein the rotor includes a second resilient sealing member adapted to sealingly contact a shaft, and a second frictional sealing face;
   (d) at least one magnet operatively positioned between the stator and the rotor urging engagement of the first frictional sealing face of the stator with the second frictional sealing face of the rotor;
   wherein the housing further includes an annular channel for receiving lubricating fluids from within the seal, and a drain port in fluidic communication with the channel; and
   wherein the annular retaining member includes one or more expulsion ports formed therein to permit lubricating fluids to move away from the rotor and into the channel during operation of the seal.

2. The seal of claim 1, wherein the magnet includes a plurality of magnets circumferentially spaced within the stator.

3. The seal of claim 1, wherein the first frictional sealing face of the stator is a composite material affixed to the stator.

4. The seal of claim 1, wherein the expulsion port includes a plurality of expulsion ports circumferentially formed into the annular retaining member.

5. The seal of claim 1, wherein the rotor is constructed from a ferrous material.

6. The seal of claim 1, wherein the first frictional sealing face of the stator extends a predetermined distance from the stator, defining a magnetic operating gap between the rotor and the stator when the first and second frictional sealing faces are in contact with one another.

7. The seal of claim 6, wherein the magnetic operating gap is set to establish a predetermined sealing force between the first and second frictional sealing faces.

* * * * *